United States Patent
Ejiri

(10) Patent No.: US 10,293,690 B2
(45) Date of Patent: May 21, 2019

(54) VEHICLE INFORMATION PROJECTING SYSTEM AND VEHICLE INFORMATION PROJECTING METHOD

(71) Applicant: NIPPON SEIKI CO., LTD., Niigata (JP)

(72) Inventor: Takeshi Ejiri, Niigata (JP)

(73) Assignee: NIPPON SEIKI CO., LTD., Niigata (JP)

(*) Notice: Subject to any disclaimer, the term of this patent is extended or adjusted under 35 U.S.C. 154(b) by 0 days.

(21) Appl. No.: 15/537,138

(22) PCT Filed: Dec. 4, 2015

(86) PCT No.: PCT/JP2015/084139
§ 371 (c)(1),
(2) Date: Jun. 16, 2017

(87) PCT Pub. No.: WO2016/098614
PCT Pub. Date: Jun. 23, 2016

(65) Prior Publication Data
US 2018/0244153 A1 Aug. 30, 2018

(30) Foreign Application Priority Data
Dec. 17, 2014 (JP) ................. 2014-255525

(51) Int. Cl.
*G02B 27/01* (2006.01)
*B60R 1/00* (2006.01)
(Continued)

(52) U.S. Cl.
CPC ............ *B60K 35/00* (2013.01); *B60R 1/00* (2013.01); *B60R 1/002* (2013.01); *B60R 11/04* (2013.01);
(Continued)

(58) Field of Classification Search
USPC .......................................... 701/41
See application file for complete search history.

(56) References Cited

U.S. PATENT DOCUMENTS

2010/0253542 A1* 10/2010 Seder .................. G01S 7/22
340/932.2
2010/0253598 A1* 10/2010 Szczerba ............... G01S 13/723
345/7
(Continued)

FOREIGN PATENT DOCUMENTS

| JP | 2005-202787 A | 7/2005 |
|---|---|---|
| JP | 2007-034684 A | 2/2007 |

(Continued)

OTHER PUBLICATIONS

Search Report issued in corresponding International Patent Application No. PCT/JP2015/084139, dated Mar. 1, 2016.

*Primary Examiner* — Tyler D Paige
(74) *Attorney, Agent, or Firm* — McDermott Will & Emery LLP

(57) ABSTRACT

A vehicle information projecting system includes: an image-capturing unit capturing an image of a road in front of a vehicle; a display mechanism projecting vehicle information onto a display region set as a portion of a windshield and displaying the vehicle information in the display region so that a virtual image of the vehicle information overlaps the actual landscape from the viewpoint of the vehicle driver; a rear vehicle information acquiring unit acquiring rear vehicle information representing the fact that a rear vehicle is present at the rear of the vehicle; lane change information acquiring units acquiring lane change information representing the fact that the vehicle is changing lanes from a traveling lane to a lane adjacent to the traveling lane; and a processing unit assessing the degree to which attention (Continued)

should be paid to the rear vehicle, based on the rear vehicle information and the lane change information.

10 Claims, 5 Drawing Sheets

(51) Int. Cl.
    *B60K 35/00*     (2006.01)
    *B60R 11/04*     (2006.01)
    *B62D 15/02*     (2006.01)
    *G08G 1/16*     (2006.01)
    *G06K 9/00*     (2006.01)
    *G08G 1/0962*     (2006.01)
    *B60W 50/14*     (2012.01)

(52) U.S. Cl.
    CPC ....... *B62D 15/029* (2013.01); *B62D 15/0295* (2013.01); *G02B 27/01* (2013.01); *G02B 27/0101* (2013.01); *G06K 9/00798* (2013.01); *G08G 1/09626* (2013.01); *G08G 1/167* (2013.01); *B60K 2310/266* (2013.01); *B60K 2350/2013* (2013.01); *B60K 2350/2052* (2013.01); *B60K 2350/352* (2013.01); *B60R 2300/00* (2013.01); *B60R 2300/205* (2013.01); *B60R 2300/308* (2013.01); *B60R 2300/804* (2013.01); *B60R 2300/8066* (2013.01); *B60R 2300/8086* (2013.01); *B60W 2050/146* (2013.01); *B60W 2540/18* (2013.01); *B60Y 2300/18166* (2013.01); *G02B 2027/014* (2013.01); *G02B 2027/0138* (2013.01); *G02B 2027/0141* (2013.01)

(56) References Cited

U.S. PATENT DOCUMENTS

2010/0253918 A1* 10/2010 Seder .................... G01S 13/723
                                                                                                 353/13
2016/0003636 A1* 1/2016 Ng-Thow-Hing ..... H04N 7/188
                                                                                                 701/26
2016/0264045 A1* 9/2016 Ng-Thow-Hing ....... B60Q 9/00

FOREIGN PATENT DOCUMENTS

| JP | 2007-112360 A | 5/2007 |
| JP | 2008-015758 A | 1/2008 |
| JP | 2009-116723 A | 5/2009 |

* cited by examiner

FIG 5

|  |  | The relative speed | | |
|---|---|---|---|---|
|  |  | Low | Middle | High |
| The relative distance | Long | The display strength I | The display strength I | The display strength II |
|  | Middle | The display strength I | The display strength II | The display strength III |
|  | Short | The display strength II | The display strength III | The display strength III |

VEHICLE INFORMATION PROJECTING SYSTEM AND VEHICLE INFORMATION PROJECTING METHOD

CROSS REFERENCE

This application is the U.S. National Phase under 35 U.S.C. § 371 of International Application No. PCT/JP2015/084139, filed on Dec. 4, 2015, which claims the benefit of Japanese Application No. 2014-255525, filed on Dec. 17, 2014, the entire contents of each are hereby incorporated by reference.

TECHNICAL FIELD

The present invention relates to a system (a vehicle information projecting system) for projecting information related to a vehicle (vehicle information) and a method (a vehicle information projecting method) therefor.

BACKGROUND ART

Patent Literature 1 discloses a vehicular display device as a vehicle projecting system for example, and on a window shield (a front glass) of a vehicle, the vehicular display device can display a degree of caution as to a road at a front side of the vehicle. Specifically, when an intersection at which a temporary stop restriction has been provided for example is present at the front side of the vehicle, the vehicular display device can determine a portion of the front side of the temporary stop line that corresponds to the temporary stop restriction (a part of a traveling lane), of the traveling lanes on which vehicles are traveling for example. In addition, the vehicular display device can determine an opposite lane which is adjacent to the traveling lane as a road having a high degree of caution. Further, the vehicular display device can determine another road crossing a traveling lane at the intersection (an intersectional road) as a road having a high degree of caution. Next, the vehicular display device of Patent Literature 1 can project a display image (a degree of caution as to a road at the front side of the vehicle) within the window shield so that the road having a high degree of caution (for example, a part of the traveling lane, an opposite lane and the intersectional road) has a red color for example, from a viewpoint of a driver of the vehicle.

Here, a range of red light which is projected on the window shield, that is, a shape of a red display image which is displayed on the window shield is coincident with a shape of a road having a high degree of caution. In other words, the shape of the red display image that is displayed on the window shield (the range of red light that is projected on the window shield) is determined according to the shape (a position) of the road having a high degree of caution as a landscape or the road having a high degree of caution in an actual space, and a virtual image of the red display image overlaps the road having a high degree of caution from the viewpoint of the driver. Projection or display on the window shield of the vehicle information that is representative of such a degree of caution, in general, is referred to as a head-up display (an HUD: a Head-Up Display) by one skilled in the art. Incidentally, in the vehicular display device of Patent Literature 1, a trajectory of future traveling of a vehicle may be projected or displayed as a road having a high degree of caution (a part of the traveling lane).

CITATION LIST

Patent Literature

Patent Literature 1: Japanese Unexamined Patent Application Publication No. 2005-202787

SUMMARY OF THE INVENTION

Problems to be Solved by the Invention

In a vehicular display device of Patent Literature 1, somewhere of the entire window shield of a vehicle, a degree of caution as to the road at the front side of the vehicle is projected and thus a display range in which the degree of caution is projected on the window shield is set within the entire window shield; and therefore, the display range is prone to be broader or larger. However, for the purpose of making the display range within the window shield broader or larger, an increase in a space for a display (a projector) which is mounted or installed on a dashboard (an instrument panel) of the vehicle is unavoidable. In other words, the space, in general, is limited by a vehicle type, and the display range within the window shield is limited to a part of the window shield.

In addition, when the display range within the window shield is made broader or larger, there may be an increase in manufacturing costs of a vehicular display device (a vehicle information projecting system) which is provided with a display intended to determine the display range. In other words, in order to restrain the increase in the manufacturing costs of the display, there may be a case in which the display range within the window shield is limited to a part of the window shield.

When the display range within the window shield is limited to a part of the window shield, it is difficult for the driver of the vehicle to recognize the landscape on which projection or display of the degree of caution in the vehicular display device of Patent Literature 1 overlaps. In other words, when the display range within the window shield is limited to a part of the window shield, the amount of information exerted by projection or display of the degree of caution in the vehicular display device of Patent Literature 1 is limited or reduced; and therefore, there is a need to efficiently execute projection or display of the degree of caution.

In addition, in the vehicular display device of Patent Literature 1, somewhere in the entire window shield of a vehicle, a degree of caution as to the road at the front side of the vehicle is projected; and therefore, a degree of caution as to a rear side of the vehicle, that is, a degree of caution as to a vehicle traveling at the rear side of the vehicle (as to a vehicle traveling at the rear side) is not projected within the window shield.

It is an object of the present invention to provide a vehicle information projecting system which is capable of efficiently projecting vehicle information such as a degree of caution or a degree of warning, for example, of a vehicle. Another object of the present invention would be self-evident to one skilled in the art with reference to the embodiment and best mode illustrated below and the accompanying drawings.

Means for Solving the Problem

In order to facilitate understanding of the summary of the present invention, embodiments according to the present invention will be exemplified below.

In a first aspect, a vehicle information projecting system, comprising:

an image-capturing unit which is capable of imaging, as an actual landscape, a road which is present at a front side of a vehicle;

a display mechanism which is capable of projecting vehicle information in a display range which is set within a part of a window shield of the vehicle and then displaying the vehicle information in the display range so that a virtual image of the vehicle information overlaps the actual landscape in a viewpoint of a driver of the vehicle;

a rear side information acquiring unit which is capable of acquiring rear side vehicle information which is representative of a rear side vehicle being present at a rear side of the vehicle;

a lane change information acquiring unit which is capable of acquiring lane change information which is representative of the vehicle making a lane change from a traveling lane of the vehicle to an adjacent lane which is adjacent to the traveling lane; and a processing unit to determine a degree of caution as to the rear side vehicle, based on the rear side vehicle information and the lane change information, wherein the processing unit is capable of generating the vehicle information so that the vehicle information includes the degree of caution and the virtual image of the vehicle information overlaps a boundary line between the traveling lane and the adjacent lane thereto.

In the first aspect, in the viewpoint of the driver, the virtual image of vehicle information (the degree of caution as to the rear side vehicle) overlaps the boundary line between the traveling lane and the adjacent lane. Here, the boundary line is a dotted while line, for example, on which the vehicle can make a lane change from the traveling lane to the adjacent lane, and the boundary line (for example, a dotted while line) is an actual landscape on the road. It becomes difficult for the driver to recognize the boundary line under the virtual image of the vehicle information (the degree of careful for the rear side vehicle); and however, the range or area of the boundary line is relatively narrow or small. In other words, on the lanes such as the traveling lane, the adjacent lane, and the opposite lane, the virtual image of the vehicle information (the degree of caution as to the rear side vehicle) is not arranged; and therefore, the amount of information related to lanes or caused by the vehicle, for example, on the lane, is neither limited nor reduced by the vehicle information (the degree of caution as to the rear side vehicle). On the other hand, the amount of information caused by the vehicle information (the degree of caution as to the rear side vehicle) on the boundary line (for example, the dotted white line) is limited or reduced by the range or area of the boundary line (for example, the dotted white line); and however, the above amount of information is sufficient to determine whether or not the driver may actually make a lane change from the traveling lane to the adjacent lane, based on the amount of information. Thus, according to the vehicle information projecting system, it is possible to efficiently project the vehicle information. In addition, according to the vehicle information projecting system, the degree of caution as to the rear side vehicle can be displayed as vehicle information in a part of the window shield of the vehicle.

Incidentally, in the degrees of caution, a degree of warning, for example, is included, and the vehicle information projecting system may not only impart a caution to the driver via the vehicle information, but also may impart a warning. In other words, when the driver actually makes a lane change from the traveling lane to the adjacent lane, the vehicle information may be a low degree of caution which is representative of the fact that the vehicle does not collide with the rear side vehicle, or alternatively, may be a high degree of caution (the degree of warning) which is representative of the fact that the vehicle obstructs traveling of the rear side vehicle.

In a second aspect depending on the first aspect, further comprising a vehicle advancement information acquiring unit which is capable of acquiring vehicle advancement information which is representative of the vehicle advancing to the boundary line, wherein the vehicle information has first vehicle information which includes the degree of caution and second vehicle information which is based on the vehicle advancement information, and the processing unit is capable of generating the first vehicle information and the second vehicle information so that the first vehicle information and the second vehicle information are displayed in the display range.

In the second aspect, not only the first vehicle information (the degree of caution as to the rear side vehicle), but also the second vehicle information, is generated. It is possible to determine whether or not the driver may actually make a lane change from the traveling lane to the adjacent lane more easily when not only the first vehicle information (the degree of caution as to the rear side vehicle), but also the second vehicle information, are projected on the window shield, than when only the first vehicle information (the degree of caution for the rear side vehicle) is projected on the window shield. In other words, when the vehicle advances to the boundary line and then makes a lane change from the traveling line to the adjacent line, the driver can momentarily associate the degree of caution as to such a lane change (the degree of caution exerted by the second vehicle information) and the first vehicle information (the degree of caution as to the rear side vehicle) with each other.

Incidentally, the vehicle advancement information acquisition unit includes, for example, a steering angle sensor, a turning angle sensor, a winker (a direction indicator), a captured image analyzer, a CPS sensor, an acceleration sensor, a vehicle speed sensor a gyroscopic sensor, or a direction sensor, or any combination thereof or the like, and the processing unit can generate the second vehicle information that is representative of the advancement direction or advancement trajectory or the like, for example, of the vehicle, based on the vehicle advancement information that is acquired by the vehicle advancement information acquiring unit.

In a third aspect depending on the second aspect, the vehicle advancement information acquiring unit includes a steering angle sensor which is capable of acquiring, as the vehicle advancement information, steering angle information which is representative of a steering wheel of the vehicle being manipulated, and the processing unit is capable of generating, in real time, the second vehicle information that changes according to the steering angle information.

In the third aspect, the vehicle advancement information acquiring unit may be a steering angle sensor or includes at least a steering angle sensor. The responsiveness of the steering angle information that is acquired by the steering angle sensor is faster than the information that is acquired by the turning angle sensor, the winker, the captured image analyzer, the GPS sensor, the acceleration sensor, the vehicle speed sensor, the gyroscopic sensor, the direction sensor, or any combination thereof or the like. Therefore, the driver can associate the degree of caution as to lane change (the degree of caution exerted by the second vehicle information) and the first vehicle information (the degree of caution as to the rear side vehicle) more momentarily with each other.

In a fourth aspect depending on the third aspect, a shape of the second vehicle information has a straight forwarding property, the processing unit is capable of generating the second vehicle information having the straight forwarding property so that an angle formed between the virtual image of the second vehicle information and the boundary line increases as an amount of manipulation of the steering wheel increases, and when the amount of manipulation reaches a predetermined amount, the processing unit is capable of generating the second vehicle information that consists of a graphics disposed to be adjacent to the first vehicle information, in place of the second vehicle information having the straight forwarding property.

In the fourth aspect, the shape of the second vehicle information has a straight forwarding property; and therefore, the driver more easily recognizes the direction in which the vehicle moves to the boundary line or the position at which the vehicle passes through the boundary line. In addition, in the fourth aspect, when the manipulation quantity of the steering wheel reaches the predetermined quantity, in other words, when an angle formed between the virtual image of the second vehicle information and the boundary line increases, making it difficult to display the second vehicle information, a graphics can be arranged or displayed adjacent to the first vehicle information (the degree of caution as to the rear side vehicle). In this manner, when the manipulation quantity of the steering wheel reaches the predetermined quantity, the driver can continue to associate the degree of caution as to lane change (the degree of caution exerted by the second vehicle information) and the first vehicle information (the degree of caution as to the rear side vehicle) with each other according to that graphics.

In a fifth aspect depending on the third aspect, a shape of the second vehicle information has a straight forwarding property, the processing unit is capable of generating the second vehicle information having the straight forwarding property so that an angle formed between the virtual image of the second vehicle information and the boundary line increases as an amount of manipulation of the steering wheel increases, and when the amount of manipulation reaches a predetermined amount, the processing unit is capable of generating fixed second vehicle information, in place of the second vehicle information that changes according to the steering angle information.

In the fifth aspect, the shape of the second vehicle information has a straight forwarding property; and therefore, the driver more easily recognize the direction in which the vehicle moves to the boundary line or the position at which the vehicle passes through the boundary line. In addition, in the fifth aspect, when the manipulation quantity of the steering wheel reaches the predetermined quantity, in other words, when an angle formed between the virtual image of the second vehicle information and the boundary line increases, making it difficult to display the second information, the second vehicle information (the angle) can be fixed. In this manner, when the manipulation quantity of the steering wheel reaches the predetermined quantity, the driver can continue to associate the degree of caution as to lane change (the degree of caution exerted by the second vehicle information) and the first vehicle information (the degree of caution as to the rear side vehicle) with each other according to the fixed second vehicle information.

In a sixth aspect depending on any one of the first to fifth aspects, the rear side vehicle information is based on a relative speed and/or a relative distance between the vehicle and the rear side vehicle, the processing unit determines a display format of the degree of caution as to the rear side vehicle, based on the relative speed and/or the relative distance, and the processing unit is capable of generating the vehicle information that changes according to the display format.

In the sixth aspect, the display format of the degree of caution as to the rear side vehicle is determined based on the relative speed and/or the relative distance. In this manner, vehicle information (for example, the first vehicle information) changes according to the display format of the degree of caution as to the rear side vehicle (the relative speed and/or the relative distance), enabling the driver to more easily determine the degree of caution as to the rear side vehicle (for example, high degree of caution or low degree of caution or the like) according to the change of the vehicle information (for example, the first vehicle information).

In a seventh aspect depending on any one of the third to fifth aspects, the processing unit determines a display format of a degree of caution as to the second vehicle information, based on a change rate of the steering angle information, and the processing unit is capable of generating the second vehicle information that changes according to the display format.

In the seventh aspect, the display format of the degree of caution as to the second vehicle lane change, for example, enabling the driver to more easily determine the degree of caution according to the change of the second vehicle information.

In an eighth aspect, a vehicle information projecting method, including:

reading, as a captured image, a road which is present at a front side of a vehicle;

detecting a rear side vehicle which is present at a rear side of the vehicle;

detecting an attempt of the vehicle to make a lane change from a traveling lane of the vehicle to an adjacent lane which is adjacent to the traveling lane;

determining a degree of caution as to the rear side vehicle before the vehicle completes a lane change from the traveling lane to the adjacent lane thereto;

generating the vehicle information, based on the degree of caution and the captured image, so that a virtual image of vehicle information overlaps a boundary line between the traveling lane and the adjacent lane thereto; and projecting the vehicle information in a display range which is set within a part of a window shield of the vehicle.

In the eighth aspect, the virtual image of the vehicle information (the degree of caution as to the rear side vehicle) overlaps the boundary line between the traveling lane and the adjacent lane. It becomes difficult to recognize the boundary line (actual landscape on the road) under the virtual image of the vehicle information (the degree of caution as to the rear side vehicle); and however, the range or area of the boundary line is relatively narrow or small. In other words, the virtual image of the vehicle information (the degree of caution as to the rear side vehicle) is not arranged on the lanes such as the traveling lane, the adjacent lane, and the opposite lane or the like; and therefore, the amount of information on the lanes or exerted by the vehicle, for example, on the lane is neither limited nor reduced by the vehicle information (the degree of caution as to the rear side vehicle). On the other hand, the amount of information caused by the vehicle information (the degree of caution as to the rear side vehicle) on the boundary line is limited or reduced by the range or area of the boundary line; and however, the above amount of information is sufficient to efficiently determine the vehicle information. Thus, according to the vehicle information projecting method, the vehicle information can be efficiently projected. In addition, according to the vehicle information projecting method, the degree of caution as to the rear side vehicle can be projected as the vehicle information in a display range set in a part of the window shield of the vehicle.

It would be easily understandable to one skilled in the art that further alterations or modifications can occur to the exemplified aspects according to the present invention without departing from the spirit of the present invention.

BRIEF DESCRIPTION OF THE DRAWINGS

FIG. 5 shows one example of a table for determining a display format of a degree of caution as vehicle information.

MODE FOR CARRYING OUT THE INVENTION

The best mode that will be described hereinafter is employed for the sake of a clear understanding of the present invention. Therefore, one skilled in the art should keep in mind that the present invention is not unreasonably limited by the embodiment described hereinafter.

Figure 1:
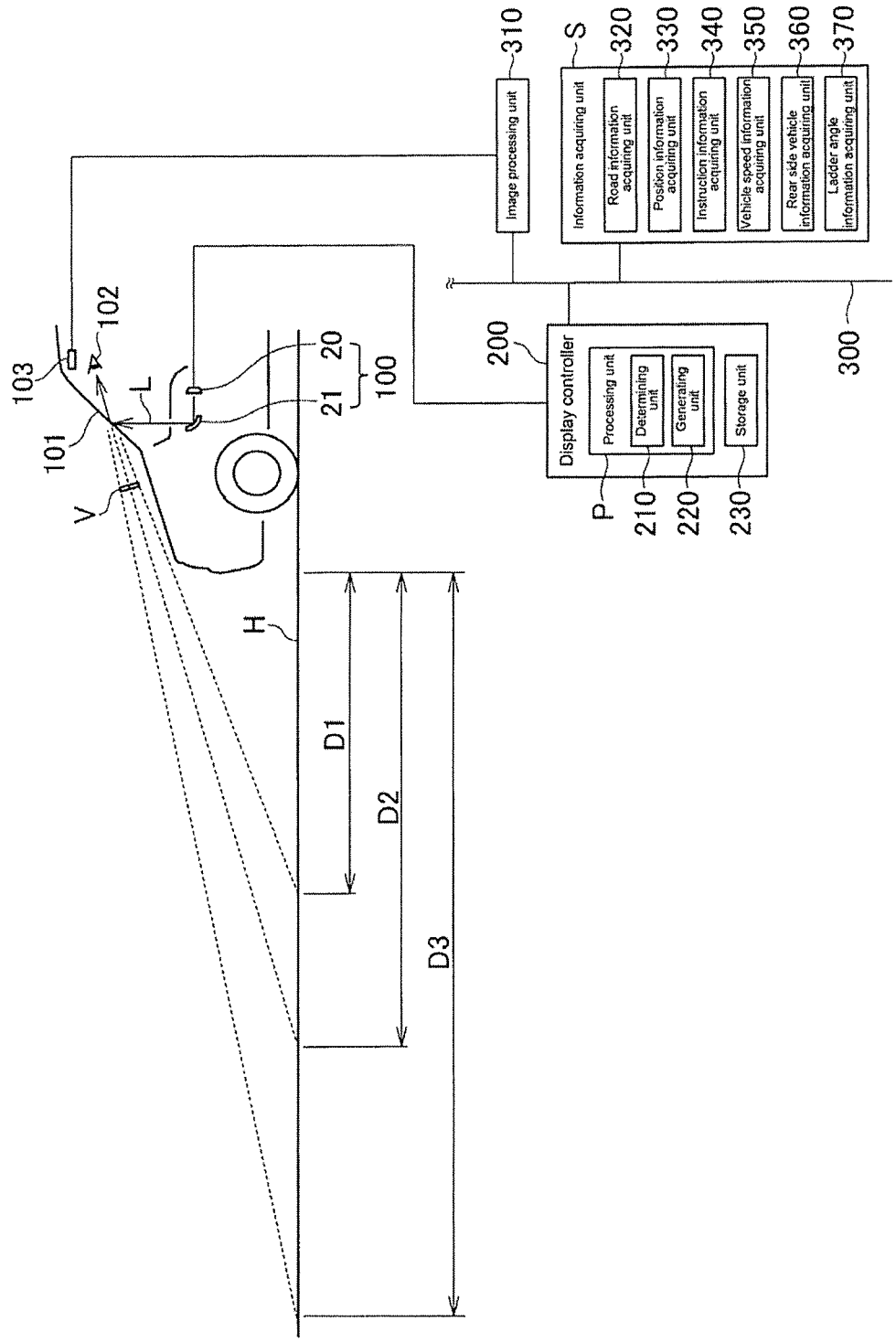
FIG. 1 shows an example of a schematic structural view of a vehicle information projecting system according to the present invention.

FIG. 1 shows an example of a schematic structural view of a vehicle information projecting system according to the present invention. As shown in FIG. 1, the vehicle information projecting system is provided with an image-capturing unit 103 and a display mechanism 100 for example. The image-capturing unit 103 is capable of acquiring an image of a road which is present at a front side of a vehicle (an actual landscape on a road). The display mechanism 100 is capable of projecting vehicle information in a display range which is set within a part of a window shield 101 of a vehicle and then displaying the vehicle information so that a virtual image V of the vehicle information overlaps the actual landscape from a viewpoint 102 of a driver of the vehicle. Such a vehicle information projecting system, in general, is referred to as an HUD system. The display mechanism 100 of FIG. 1 has a display 20 and a reflector 21 for example. The display mechanism 100, in general, is referred to as an HUD or an HUD device. The display mechanism 100 is typically housed in a dashboard; and however, all or part of the display mechanism 100 may be disposed outside of the dashboard. Incidentally, the display 20 may be referred to as a projector, since the display is intended to project vehicle information within the window shield 101.

The vehicle information projecting system of FIG. 1 is further provided with an information acquiring unit S for example, and the information acquiring unit S has at least a rear side vehicle information acquiring unit 360. The rear side vehicle information acquiring unit 360 is capable of acquiring rear side vehicle information which is representative of the fact that a rear side vehicle (not shown) is present at a rear side of a vehicle. The information acquiring unit S of FIG. 1 has not only the rear side vehicle information acquiring unit 360, but also a lane change information acquiring unit, and here, the lane change information acquiring unit is capable of acquiring lane change information which is representative of the fact that a vehicle is making a lane change from a vehicle traveling lane to an adjacent lane which is adjacent to the traveling lane. Incidentally, the lane change information includes an attempt to make a lane change from the vehicle traveling lane to the adjacent lane that is adjacent to the traveling lane (the start of the lane change), whereas the lane change information may not include the end of the vehicle that makes a lane change from the traveling lane to the adjacent lane thereto (the end of the lane change).

In FIG. 1, the lane change information acquiring unit is composed of a road information acquiring unit 320, an instruction information acquiring unit 340, and a ladder angle information acquiring unit 370 for example. Of course, the lane change information acquiring unit may be the road information acquiring unit 320, the instruction information acquiring unit 340, or the ladder angle information acquiring unit 370 solely, or alternatively, may be any combination of these units. In addition, the lane change information acquiring unit is not limited to the combination shown in FIG. 1, and another information acquiring unit may be employed.

The vehicle information projecting system of FIG. 1 is further provided with a display controller 200 for example, and the display controller 200 has at least a processing unit P. Incidentally, the display controller 200 is typically housed in a dashboard; and however, all or part of the display controller 200 may be disposed outside of the dashboard. A combination of the display mechanism 100 and the display controller 200 may be referred to as an HUD or an HUD device. The processing unit P of FIG. 1 is composed of a determining unit 210 and a generating unit 220 for example, and the processing unit P or the determining unit 210 can determine a degree of caution as to a rear side vehicle, based on the lane change information that is acquired by the lane change information acquiring unit such as the instruction information acquiring unit 340 and the rear side vehicle information that is acquired by the rear side vehicle information acquiring unit 360 for example. Next, the processing unit P and the generating unit 220 are capable of generating the vehicle information so that the vehicle information that is projected within the window shield 101 includes the degree of caution as to the rear side vehicle and the virtual image V of the vehicle information overlaps a boundary line between the traveling lane and the adjacent lane thereto.

In FIG. 1, the display mechanism 100 or the display 20 is controlled by the display controller 200 or the processing unit P in order to display the virtual image V via the window shield 101, and the display 20 is thereby capable of generating or radiating display light L (projection light) which is based on the vehicle information. The reflector 21 guides an optical path of the display light L from the display 20 to the window shield 101, so that a driver can recognize the display light L (vehicle information) within the window shield 101 as the virtual image V. Incidentally, the display 20 has a liquid crystal panel for example, and in FIG. 1, a single display 20 is shown; and however, the display 20 may be of dual display or left and right display type for example, in other words, the virtual image V may be a three-dimensional virtual image for the driver's eyes.

A vehicle (a driver's own vehicle) to which the vehicle information projecting system is to be mounted is a motor vehicle for example in FIG. 1, and the motor vehicle is capable of traveling on a horizontal line H or on a road. From the viewpoint 102 of the driver, the height or depth of the virtual image V of FIG. 1 is set at a predetermined distance from a distance D1 to a distance D3 for example. In other words, from the viewpoint 102 of the driver, a lower end of the virtual image V is present at the front side by the distance D1 from the vehicle; an upper end of the virtual image V is present at the front side by the distance D3 from the vehicle; and a neutral point in a vertical direction of the virtual image V is present at the front side by the distance D2 from the vehicle. The distance D1, the distance D2, and the distance D3 are 20 [m] for example, 30 [m] for example, and 50 [m] for example, respectively.

In FIG. 1, a single reflector 21 is shown; and however, the reflector 21 may be of dual reflector type for example, in other words, an optical path of the display light L from the display 20 to the window shield 101 may be adjusted, and the distance D1, the distance D2, and the distance D3 may be adjusted in accordance with an ideal height of the viewpoint 102 of the driver (an ideal height as to the driver's sitting height) and the optical path of the display light L. In addition, the reflector 21, in general, expands the display light L from the display 20, and in addition, the reflector 21 or the display controller 200 (for example, a processing unit P), in general, can correct distortion in the display range that is set within a part of the window shield 101 (for example, distortion of a glass surface).

The display controller 200 of FIG. 1 is further provided with a storage unit 230 for example, and the storage unit 230 can store a variety of data which are required for processing or computation of the processing unit P of the determining unit 210 and the generating unit 220 or the like for example. The display controller 200 is typically composed of a microcomputer for example, and can include a memory such as a CPU, a ROM, and a RAM or the like and an input and output interface or the like. The processing unit P is typically composed of a CPU and a RAM (a work area), and the storage unit 230 is typically composed of a ROM (for example, an EEPROM). For example, the ROM may store a program which causes the CPU to execute a predetermined operation (vehicle information projecting method), and the RAM can form a work area of the CPU. In addition, the ROM can store data which is required for determining or computing vehicle information for example. The display controller 200 of FIG. 1 is connected to an information acquiring unit S for example, via a LAN 300 (for example, a bus-type LAN) which is disposed or mounted on the vehicle. The display controller 200, in general, may be referred to as an ECU (an Electronic Control Unit).

Incidentally, when the information acquiring unit S is composed of a plurality of information acquiring units, in other words, when the information acquiring unit S has the rear side vehicle information acquiring unit 360 for example, and the ladder angle information acquiring unit 370 for example, each of the plurality of information acquiring units (for example, the rear side vehicle information acquiring unit 360, the ladder angle information acquiring unit 370 or the like) is connected to the display controller 200 via the LAN 300 for example. Each information acquiring unit which constitutes the information acquiring unit S (for example, the rear side vehicle information acquiring unit 360, the ladder angle information acquiring unit 370 or the like), in general, may be referred to as an ECU or a sensor.

In FIG. 1, the display controller 200 is connected to an image processing unit 310 via the LAN 300. The image processing unit 310 of FIG. 1 picks up a captured image from the image-capturing unit 103 having an imaging element such as a CCD for example, and based on the captured image, can detect or extract the boundary line between a plurality of lanes, for example (for example, a dotted white line, a solid while line, solid yellow (orange)) in real time. In addition, the image processing unit 310 may detect or extract a lane or a road, or alternatively, may detect or extract a front side vehicle (for example, a vehicle traveling at a front side or a vehicle traveling at an opposite side) which is present at the front side of the vehicle and/or an obstacle or the like. The image-capturing unit 103 is a camera (a front side camera) for example, and is installed in the vicinity of an inner rearview mirror (a rearview mirror) which is not shown for example. The image-capturing unit 103 may be an exclusive image-capturing unit or may be a shared image-capturing unit (an image-capturing unit which is available not only in a vehicle information projecting system, but also in a drive recorder for example).

Of course, the image processing unit 310 of FIG. 1 may be omitted, in other words, it may be that the display controller 200 is directly connected to the image-capturing unit 103 via the LAN 300 for example, and the display controller 200 or the processing unit P detects or extracts an object such as a boundary line for example, by itself, based on the captured image (the actual landscape). Alternatively, when the information acquiring unit S has a position information acquiring unit 330 and the road information acquiring unit 320 for example, the display controller 200 or the processing unit S may detect or extract information of an object such as a road (a shape of an object) which is based on a vehicle position (for example, a current position), via the LAN 300, the position information acquiring unit 330, and the road information acquiring unit 320 for example.

The rear side vehicle information acquiring unit 360 of FIG. 1 is composed of a camera (a rear side camera) for example and an image processing unit (an image processing unit for rear side camera) for example, and can detect or extract a rear side vehicle which is present at the rear side of a vehicle (for example, a motor vehicle or a four-wheel vehicle, an motorcycle, or a two-wheel vehicle). Of course, the rear side vehicle information acquisition unit 360 of FIG. 1 may be a radar device or a sonar device or the like for example, and the rear side vehicle information acquiring unit 360 can detect or extract an object as a rear side vehicle. Alternatively, the rear side vehicle information acquiring unit 360 may be an inter-vehicle communication device, an on-road inter-vehicle communication equipment or the like for example, and may detect or receive a position of a rear side vehicle (for example, an absolute position).

The rear side vehicle information acquiring unit 360 is preferably disposed or set so that this acquiring unit per se can detect a rear side vehicle which travels on an adjacent lane which is adjacent to a traveling lane. The rear side vehicle that travels on the adjacent lane thereto is a rear side vehicle which is positioned at a rear left or right side with respect to the vehicle (the driver's own vehicle). In addition, the rear side vehicles include a rear side vehicle which is positioned at the left adjacency or right adjacency to the driver's own vehicle, which does not pass the driver's own vehicle, in which a part of the rear side vehicle is present in each direction of the driver's own vehicle for example.

The rear side vehicle information acquiring unit 360 of FIG. 1 detects a rear side vehicle, and preferably detects a relative distance between the vehicle (the driver's own vehicle) and the rear side vehicle. The rear side vehicle information acquiring unit 360 of FIG. 1 further preferably detects not only the relative distance and a relative speed between the vehicle (the driver's own vehicle) and the rear side vehicle. Of course, the rear side vehicle information acquiring unit 360 may detect only the presence of the rear side vehicle, alternatively may detect only the absolute position of the rear side vehicle, or alternatively, may detect either the relative speed or the relative distance. When the rear side vehicle information acquiring unit 360 detects only the presence of the rear side vehicle (presence detection information), the display controller 200 or the processing unit P may detect or extract the relative distance and/or the relative speed for example, by itself, based on the presence detection information of the rear side vehicle.

When the rear side vehicle information acquiring unit 360 detects or acquires the absolute speed for example, of the rear side vehicle, the rear side vehicle information acquiring unit 360 or the display controller 200 (a processing unit P) for example may detect or compute the relative speed in view of the absolute speed of the vehicle (the driver's own vehicle) which is acquired by a vehicle speed information acquiring unit 350 for example (such as a meter or a vehicle wheel speed sensor for example).

The ladder angle information acquiring unit 370 of FIG. 1 can detect or acquire the ladder angle information of the vehicle (the driver's own vehicle). The ladder angle information includes ladder angle information which is representative of the fact that a steering angle of the driver's own vehicle is manipulated by a driver for example, and a turning angle information or the like which is representative of the fact that turning wheels (for example, front wheels) of the driver's own vehicle are driven by a motor (not shown) for example. In other words, the ladder angle information acquiring unit 370 includes a ladder angle sensor for example, which is capable of acquiring rotation of the steering wheel or steering column, or alternatively, a turning angle sensor for example, which is capable of acquiring rotation of a motor shaft or a turning wheel for example. Incidentally, the ladder angle information acquiring unit 370 may be an ECU for power steering or an ECU for sideslip prevention or the like for example, which is capable of transmitting ladder angle information to the display controller 200 (the processing unit P) via the LAN 300 for example.

Next, the instruction information acquiring unit 350 of FIG. 1 can detect or acquire the instruction information for the vehicle (the driver's own vehicle). The instruction information includes the direction indication information or the like which is representative of the fact that a winker (a direction indicator) of the driver's own vehicle is operated by the driver for example. In other words, the instruction information acquiring unit 350 may be a winker which is capable of outputting an operation for the winker for example. Incidentally, the instruction information acquiring unit 350 may be an ECU or the like for meter for example, which is capable of transmitting the direction indication information to the display controller 200 (the processing unit P) via the LAN 300 for example.

Next, the road information acquiring unit 320 of FIG. 1 can detect or acquire the periphery of the vehicle (the driver's own vehicle) or the front side road information (for example, road information in a traveling direction). The road information includes the turn image road information or the like which is representative of the fact that a turn (turning) of a driver's own vehicle is reflected in a road. In other words, the road information acquiring unit 320 may be an image analyzer for example, which analyzes an image varying according to traveling or advancement of the driver's own vehicle. This image may be a captured image which is acquired by an exclusive camera for example, or alternatively, may be a captured image which is acquired by a front side camera or a rear side camera which will be described later.

In place of the road information acquiring unit 320, as a vehicle advancement information acquiring unit, the image processing unit 310 may be employed for example. In other words, the image processing unit 310 (the captured image analyzer) may detect or extract a lane change of the driver's own vehicle (the degree of the lane change), based on the captured image (a front side captured image which is representative of the front side road) from the image-capturing unit 103 (the front side camera).

Alternatively, in place of the road information acquiring unit 320, as the vehicle advancement information acquiring unit, the rear side vehicle information acquiring unit 360 may be employed for example. In other words, the rear side vehicle information acquiring unit 360 (the captured image analyzer) may detect or extract a lane change of the driver's own vehicle (the degree of the lane change), based on the captured image (the rear side road captured image which is representative of the rear side road) from the rear side camera for example.

In the meanwhile, the road information acquiring unit 320 may detect or acquire traffic road information. The traffic road information may include lane change road information which is representative of whether or not a road on which a driver's own vehicle is traveling has a plurality of lanes, in other words, whether or not the driver's own vehicle can make a lane change on the road. For example, the processing unit P or determining unit 210 of the display controller 200 acquires or updates the lane change road information according to the position of the driver's own vehicle (for example, the current position), and based on the lane change road information, may determine whether or not the driver's own vehicle can make a lane change. When it is determined that the driver's own vehicle cannot make a lane change, based on the lane change road information, the display controller 200 may be stop operation of the image processing unit 310 for example. The road information acquiring unit 320 may be a navigation device for example, and the position information acquiring unit 330 may be a GPS sensor for example.

Figure 2:
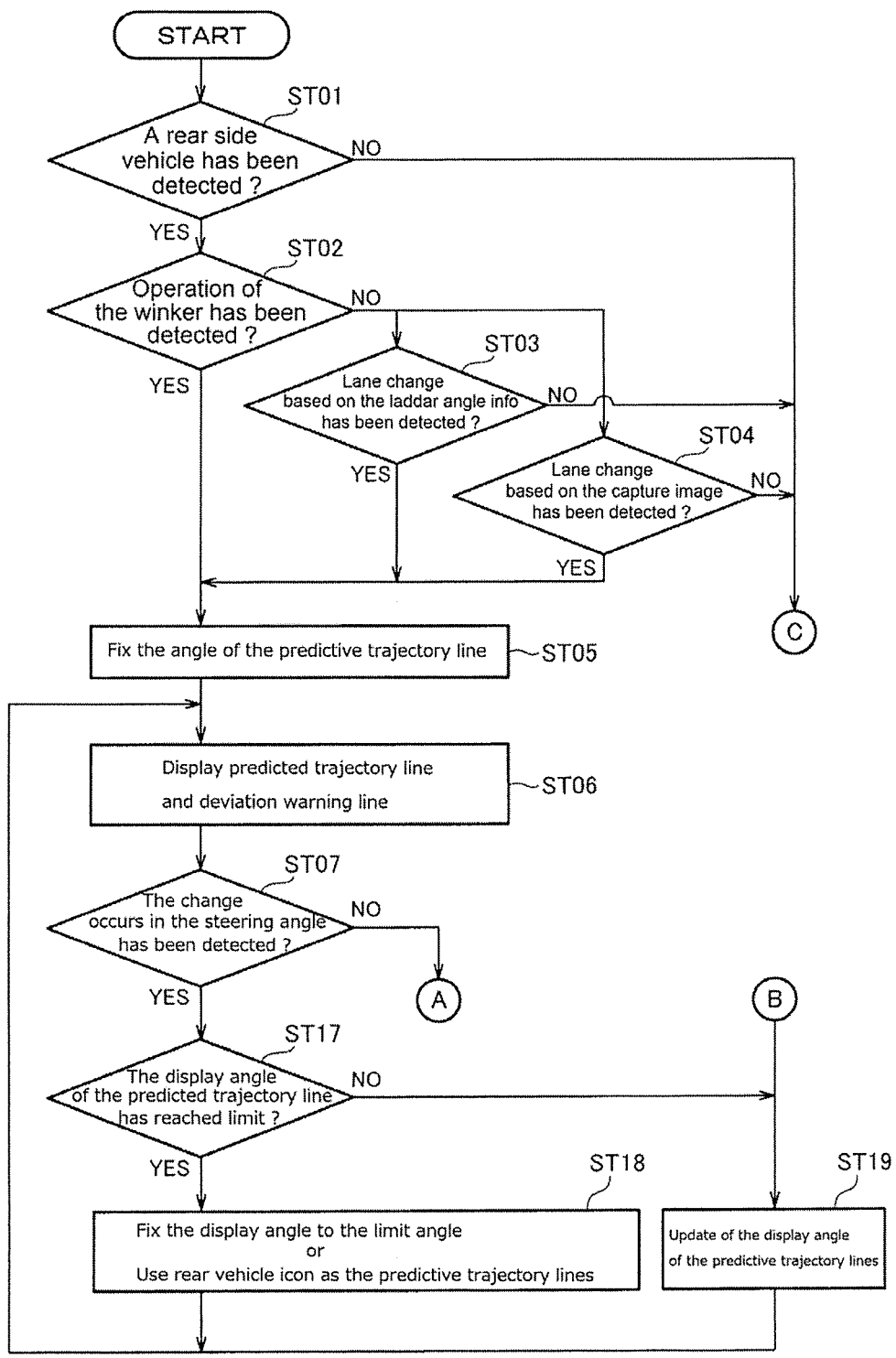
FIG. 2 shows a flowchart which is representative of a part of one example of a general operation in the vehicle information projecting system or a display controller, of FIG. 1.
Figure 3:
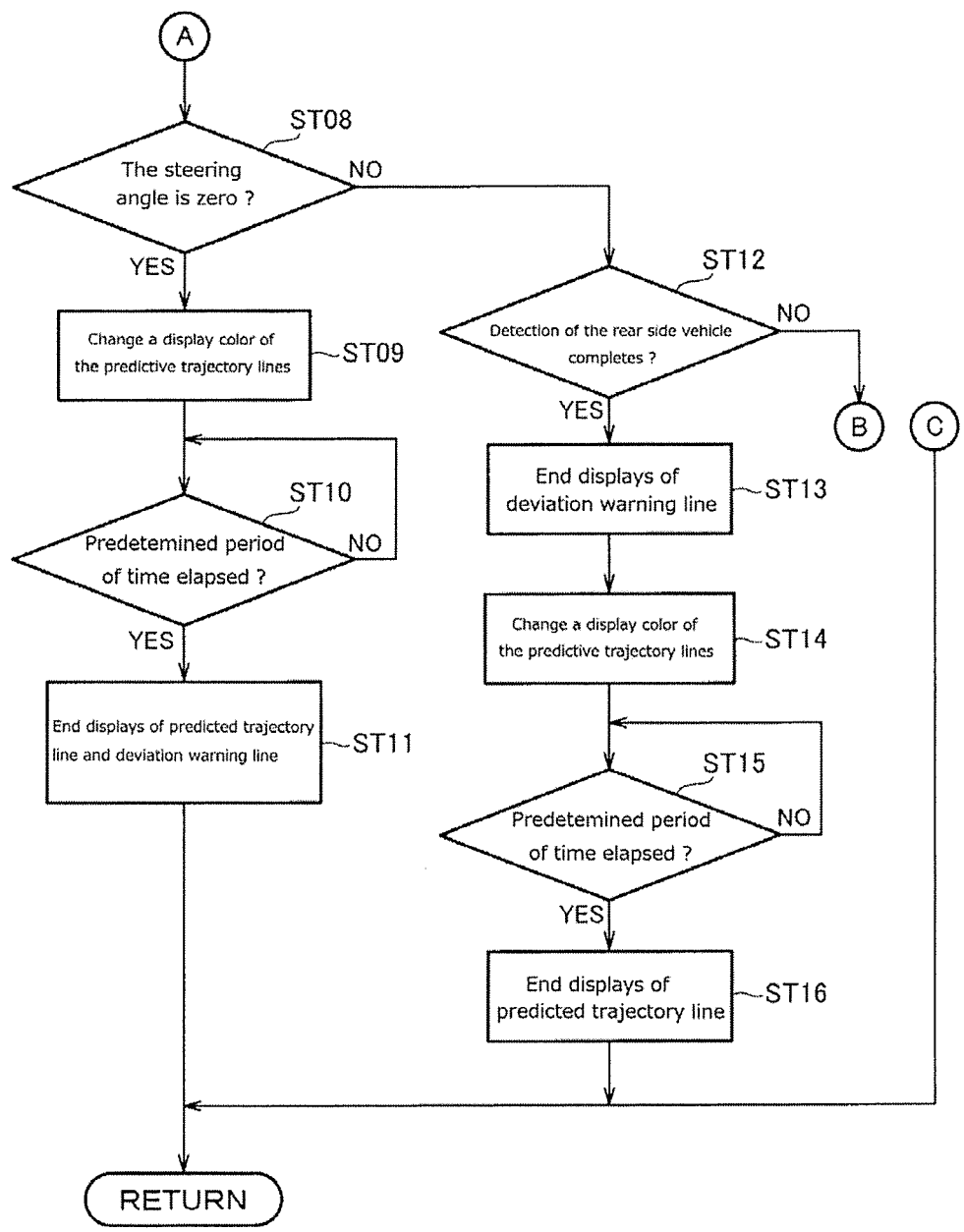
FIG. 3 shows a flowchart which is representative of a remaining part of one example of the vehicle information projecting system or the display controller, of FIG. 1.
Figure 4:
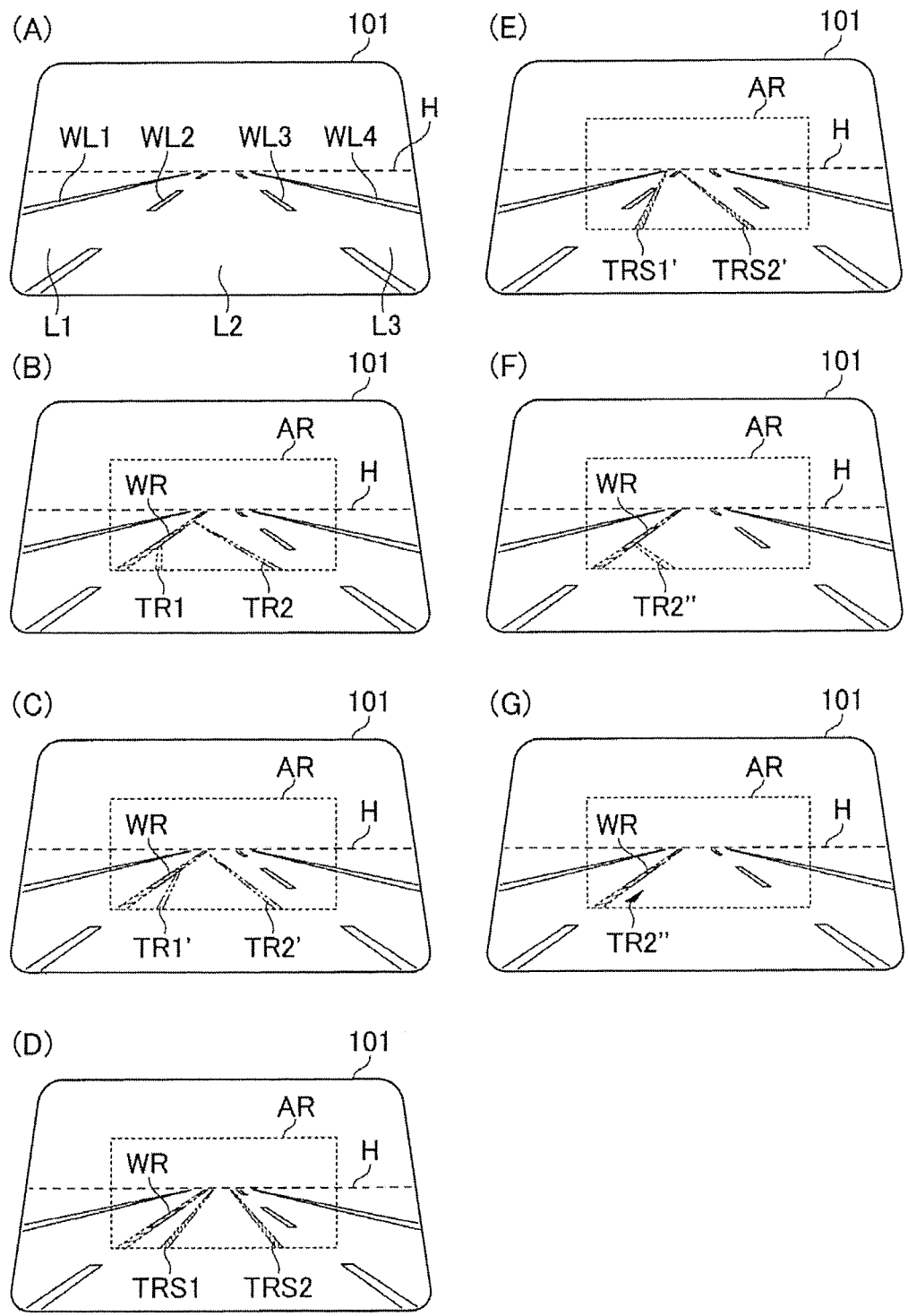
FIG. 4(A) shows one example of an actual landscape which is recognized via a window shield, and each of FIG. 4(B), FIG. 4(C), FIG. 4 (D), FIG. 4(E), FIG. 4(F)
FIG. 4(G) shows one example of vehicle information which is projected in a display range which is displayed within a part of the window shield of FIG. 4(A).

FIG. 2 and FIG. 3 each show a flowchart which is representative of one example of general operation of the vehicle information projecting system and the display controller 200, of FIG. 1. In addition, FIG. 4(A) shows one example of the actual landscape which is recognized via the window shield 101 of FIG. 1; and each of FIG. 4(A), FIG. 4(B), FIG. 4(C), FIG. 4(D), FIG. 4(E), FIG. 4(F), and FIG. 4(G) show one example of vehicle information which is projected in a display range AR which is set within a part of the window shield 101 of FIG. 4(A). Incidentally, in FIG. 4(B) or the like for example, the display range AR is set on a glass surface which constitutes the window shield 101; and however, the display range AR may be formed of a combiner which is disposed on a dashboard for example, in the vicinity of the window shield 101, or on the rear side vehicle information acquisition unit 360 in a room for example. In other words, the combiner may be disposed so that the display range AR is set within a part of the window shield 101 in the viewpoint 102 of the driver.

The display controller 200 of FIG. 1 can determine whether or not a rear side vehicle has been detected, via the rear side vehicle information acquiring unit 360 for example (refer to step ST01 of FIG. 2). When the rear side vehicle information acquiring unit 360 has a rear side camera for example, the rear side vehicle information acquiring unit 360 can determine or analyze whether or not the captured images that are acquired by the rear side camera include a rear side vehicle such as a motor vehicle or a motorcycle for example. Here, the rear side camera is a stereo camera for example, and preferably, the rear side vehicle information acquiring unit 360 can compute or analyze the relative distance between the vehicle (the driver's own vehicle) and the rear side vehicle. Further preferably, the rear side vehicle information acquiring unit 360 can compute or analyze the relative speed between the driver's own vehicle and the rear side vehicle, based on the relative distance, specifically based on a time difference in relative distance for example.

Incidentally, the rear side vehicle information acquiring unit 360 may acquire or analyze rear side vehicle information such as advancement direction or advancement trajectory for example, of the rear side vehicle. Of course, the rear side vehicle information acquiring unit 360 that is capable of acquiring the rear side vehicle information that is representative of the fact that the rear side vehicle is present at the rear side of the driver's own vehicle may be a radar device for example, or alternatively, may be a combination of the rear side camera and the radar device for example.

When the rear side vehicle is detected, the display controller 200 can determine whether or not a lane change of the driver's own vehicle has been detected, via the instruction information acquiring unit 340 for example. When the instruction information acquiring unit 340 is a winker for example, the winker is capable of outputting operation information (instruction information) of the winker by the driver to the display controller 200. Therefore, the display controller 200 can determine whether or not operation of the winker by the driver has been detected (refer to step ST02 of FIG. 2).

When any operation of the winker is not detected, in other words, when the display controller 200 does not detect an attempt of the driver's own vehicle to make a lane change from the traveling lane to the adjacent lane thereto via the winker, the display controller 200 can determine whether or not a lane change of the driver's own vehicle has been detected, based on the ladder angle information from the ladder angle information acquiring unit 370 for example (refer to step ST03 of FIG. 2). When the ladder angle information acquiring unit 370 includes a ladder angle sensor which is capable of acquiring the ladder angle information that is representative of the fact that the steering wheel of the driver's own vehicle is manipulated, the responsiveness of the ladder angle information that is acquired by the ladder angle sensor is prone to be faster. In other words, when the ladder angle information is steering angle information, the display controller 200 determines a lane change of the driver's own vehicle more easily.

When any operation of the winker is not detected in step ST02 of FIG. 2, the display controller 200 can determine whether or not a lane change of the driver's own vehicle has been detected, based on the analysis information (for example, analysis result of the front side road captured image that is representative of the front side road) from the image processing unit 310 (the captured image analyzer) for example (refer to step ST04 of FIG. 2).

Next, when a lane change is detected in step ST03 and/or step ST04 of FIG. 2, the display controller 200 can execute step ST05. Alternatively, when any lane change is not detected in step ST03 and step ST04 of FIG. 2, the display controller 200 can execute step ST01 again (refer to RETURN of FIG. 3).

Incidentally, when step ST05 of FIG. 2 is executed, the display controller 200 detects an attempt of the driver's own vehicle to make a lane change from the traveling lane to the adjacent lane thereto, via either one of the steering angle sensor and the captured image analyzer, in other words, via the lane change information acquiring unit. At the same time, the display controller 200 detects a rear side vehicle as well via the rear side camera for example, in other words, via the rear side vehicle information acquiring unit 360. In step ST05 of FIG. 2, the display controller 200, presupposing that projection or display of the degree of caution as to a rear side vehicle (for example, a deviation warning line) as lane information (first lane information) (refer to step ST06 of FIG. 2), employs projection or display of the degree of caution as to a lane change (for example, a predictive trajectory line) as lane information (second lane information) and then determines information which is required for that display (for example, a display angle).

In step ST05 of FIG. 2, the display controller 200 can determine the display angle of the predictive trajectory line via the steering angle sensor, for example. The predictive trajectory line is preferably a straight line, and in FIG. 4(B) for example, is indicated by two predictive trajectory lines TR1, TR2 for example, which are respectively straight lines for example. When the driver turns the steering wheel to the left for example, the two predictive trajectory lines TR1, TR2 of FIG. 4(B) can represent that the advancement direction or advancement trajectory of the driver's own vehicle is towards the left side. The predictive trajectory line TR1 at the left side of FIG. 4(B) corresponds to the front wheel at the left side of the driver's own vehicle for example, and the display angle of the predictive trajectory line TR1 at the left side is preferably in a direction in which the actual front wheel at the left side will advance on the road in the future in the viewpoint 102 of the driver. Similarly, the predictive trajectory line TR2 at the right side of FIG. 4(B) corresponds to the front wheel at the right side of the driver's own vehicle, and the display angle of the predictive trajectory line TR2 at the right side is preferably in a direction in which the actual front wheel at the right side will advance on the road in the future in the viewpoint 102 of the driver. Of course, in place of the two predictive trajectory lines TR1, TR2 for example, there may be employed one predictive trajectory line for example, having a display angle which is a direction in which an actual neutral point of the driver's own vehicle (for example, a neutral point of each of the left and right wheels) will advance on the road in the future in the viewpoint 102 of the driver.

Next, the display controller 200 can generate, as second vehicle information, a predictive trajectory line having a display angle which is determined according to steering angle information from a steering angle sensor for example (two predictive trajectory lines TR1, TR2 for example, of FIG. 4(B) for example). Similarly, the display controller 200 can determine a display angle of a deviation warning line for example, according to the boundary line between a plurality of lanes which is detected by the image processing unit 310 for example, based on the captured image from the image-capturing unit 103 (the front side camera) (a front side road captured image which is representative of the front side road). Next, the display controller 200 can generate, as first vehicle information, a deviation warning line having the display angle (one deviation warning line WR for example, of FIG. 4(B) for example).

Next, the display controller 200 generates a display image (a projection image) which consists of the first vehicle information and second lane information for example, and can send the display image to the display 20. In other words, the display controller 20 can display a predictive trajectory line for example, and a deviation warning line for example, in the display range AR, via the display 20 or the display mechanism 100 for example (refer to step ST06 of FIG. 2).

In the meanwhile, the virtual image of one deviation warning line WR (first vehicle information) for example, of FIG. 4(B) for example, overlaps a dotted white line WL2 (the actual landscape) for example, between the traveling lane L2 of the driver's own vehicle and the adjacent lane L1 thereto at the left side of FIG. 4(A) in the viewpoint 102 of the driver. In other words, the display controller 200 determines the shape of one deviation warning line WR (the first vehicle information) for example, based on the shape of the dotted white line WL2 that is detected by the image processing unit 310 for example.

With reference to FIG. 4(B) for example, the dotted white line WL2 under the virtual image of the deviation warning line WR that is representative of the degree of warning for example, of the rear side vehicle, is hardly recognized by the driver; and however, the range or area of the dotted white line WL2 is relatively narrow or small. In other words, the virtual image of the deviation warning line WR is not disposed on a lane such as the traveling lane L2 or the adjacent lane L1 thereto; and therefore, the amount of information exerted by the lanes L1 to L3 is neither limited nor reduced by the deviation warning line WR. In this manner, the driver can continue to drive the driver's own vehicle more safely. On the other hand, the amount of information exerted by the deviation warning line WR is limited or reduced by the range or area of the dotted white line WL2; and however, the amount of information is sufficient for the driver to determine a lane change. Hence, according to the vehicle information projecting system or the vehicle information projecting method, it is possible to efficiently project vehicle information such as deviation warning line WR.

In addition, as vehicle information, not only the deviation warning line WR (the first vehicle information), but also two predictive trajectory lines TR1, TR2 (second vehicle information) for example, are generated. The driver can determine whether or not a lane change from the traveling lane L2 to the adjacent lane L1 thereto may be made more easily by not only the deviation warning line WR, but also two predictive trajectory lines TR1, TR2 being projected within the window shield 101, rather than by only the deviation warning line WR being projected within the window shield 101. In other words, when the driver's own vehicle advances to the boundary line (for example, a dotted white line WL2) under the deviation warning line WR and then makes a lane change from the traveling lane L2 to the adjacent lane L1 thereto, the driver can momentarily associate such degree of caution as to a lane change (a degree of caution exerted by second vehicle information) and first vehicle information (such as a degree of caution as to rear side vehicle or a degree of warning) with each other.

Incidentally, with reference to FIG. 1, the virtual image of the deviation warning line WR (the first vehicle information) of FIG. 4(B) for example is present at the front side by at least the distance D1 from the driver's own vehicle (for example, 20 [m]) in the viewpoint 201 of the driver; and therefore, in projection or display of only the deviation warning line WR for example, some drivers may hardly recognize the contents of vehicle information such as the degree of caution as to the rear side vehicle or degree of warning (only the first lane information). Alternatively, other drivers sufficiently recognize the contents of vehicle information such as the degree of warning (only the first lane information).

In FIG. 4(B) for example, the shape of the deviation warning line WR (the first vehicle information) is a solid straight line for example, based on the shape of the dotted white line WL2. The solid straight line that is representative of the deviation warning line WR extends from an end or a lower end for example, of the display range AR up to the horizontal line H for example. In other words, in so far as the solid straight line that is representative of the deviation warning line WR is concerned, the dotted white line WL2 on the road is indicated by the maximum length in the display range AR. In this manner, the driver can recognize the deviation warning line WR (the first vehicle information) more easily. However, the shape of the deviation warning line WR (the first vehicle information) may be a dotted straight line for example, which is the same as the shape of the dotted white line WL2 for example. When the shape of the deviation warning line WR is the dotted straight line for example, the intervals of the dotted line related to the deviation warning line WR may be coincident with the intervals of the dotted line related to the white line WL2 or may not be coincident therewith, in other words, the type of the intervals of the dotted line related to the deviation warning line WR is arbitrary. Further, the shape of the deviation warning line WR may be a dashed straight line for example. In other words, when the deviation warning line WR is a straight line for example, the type of that straight line is arbitrary. In addition, the shape of the deviation warning line WR (the first vehicle information) may not start from an end or a lower end for example, of the display range AR, or alternatively, may not end at the horizontal line H.

In FIG. 4(B) for example, the shape of the two predictive trajectory lines TR1, TR2 (the second vehicle information) for example is a solid straight line for example, based on the advancement direction and the advancement trajectory or the like of the driver's own vehicle. Each of the two solid straight lines which are representative of the two predictive trajectory lines TR1, TR2 for example extends from an end or a lower end for example, of the display range AR up to the deviation warning line WR for example. In other words, in so far as each of the two solid straight lines that are representative of the two predictive trajectory lines TR1, TR2 is concerned, the advancement direction and the advancement trajectory of the driver's own vehicle on the road are not indicated by the maximum length in the display range AR, and ends at the deviation warning line WR. In this manner, the amount of information that is present on the extension lines of the two predictive trajectory lines TR1, TR2, each of which is more extensive than the deviation warning line WR, is neither limited nor reduced by the two predictive trajectory lines TR1, TR2 ending at the deviation warning line WR. In addition, the driver can associate the two predictive trajectory lines TR1, TR2 and the deviation warning line WR to each other more strongly. Incidentally, the shape of the two predictive trajectory lines TR1, TR2 (the second vehicle information) for example may be a dotted solid line for example, or alternatively, may be a dashed solid line. When each of the two predictive trajectory lines TR1, TR2 for example is a straight line for example, the type of the straight line is arbitrary.

Next, in order to update in real time a display angle which is determined according to steering angle information from the steering angle sensor for example, in step ST07 of FIG. 2, the display controller 200 can determine whether or not a change occurs in the steering angle information that has been employed in step ST05. Specifically, when the driver returns a left turn for example of the steering wheel to its original position, the display controller 200 can determine that an increase in the steering angle is not detected for example, in other words, a decrease in the steering angle is detected. When the increase in the steering angle is not detected, in other words, when the decrease in the steering angle is detected, the display controller 200 can determine whether or not the steering angle has returned to zero (an initial value) (refer to step ST08 of FIG. 3).

Incidentally, when the decrease in the steering angle is detected, the two predictive trajectory lines TR1, TR2 of FIG. 4(B) for example are changed to two predictive trajectory lines TR1', TR2' of FIG. 4(C) for example. Afterwards, when the decrease in the steering angle is continuously detected and then zero (the initial value) of the steering angle is detected, the two predictive trajectory lines TR1', TR2' of FIG. 4(C) for example is changed to two predictive trajectory lines TRS1, TRS2 of FIG. 4(D) for example.

When the steering angle returns to zero (the initial value) the display controller 200 can change a display color of the predictive trajectory lines (refer to step ST09 of FIG. 3). As one example, the display color of the two predictive trajectory lines TR1', TR2' of FIG. 4(C) for example is yellow (orange) for example, and the display color of the two predictive trajectory lines TRS1, TRS2 of FIG. 4(D) for example is green for example. In this manner, the driver can recognize that even if the driver's own vehicle is advanced as it is, the vehicle is safe. In other words, for example, green is a color which is representative of permission of advancement of the driver's own vehicle, and which is one of the three colors for example of a signaling mechanism. In addition, yellow (orange) is a color which is representative of caution as to advancement of the driver's own vehicle, and which is one of the three display colors for example, of the signaling mechanism for example. Incidentally, for example, the display color of the deviation warning line WR of FIG. 4(C) is red for example, in other words, a color which is representative of inhibition of advancement of the driver's own vehicle, and which is a remaining one of the three display colors for example of the signaling mechanism.

When the steering angle returns to zero (the initial value), a lane change of the driver's own vehicle is canceled and thus projection or display of the two predictive trajectory lines TR1, TR2 of FIG. 4(C) for example may be stopped immediately. However, the display color of the predictive trajectory lines is changed in step ST09 of FIG. 3, the driver can recognize a normal operation in the vehicle information projecting system or the vehicle information projecting method. Therefore, the display controller 200 continues the display of the two predictive trajectory lines TRS1, TRS2 of FIG. 4(D) for example, for a predetermined period of time, and can stop not only the display of the two predictive trajectory lines TRS1, TRS2 of FIG. 4(D) for example, but also the display of the deviation warning line WR of FIG. 4(D) for example (refer to step ST10 and step ST11 of FIG. 3).

On the other hand, when the steering angle does not return to zero (the initial value), the display controller 200 can determine whether or not the rear side vehicle is continuously detected, in other words, whether or not detection of the rear side vehicle completes (refer to step ST12 of FIG. 3). When detection of the rear side vehicle completes, the display controller 200 can immediately stop the display of the deviation warning line WR of FIG. 4(C) for example (refer to step ST13 of FIG. 3 and FIG. 4(E)). Next, the display controller 200 can continue, for a predetermined period of time, in another display format, the display of the two predictive trajectory lines TR1', TR2' of FIG. 4(C) for example (refer to step ST14 and step ST15 of FIG. 3 and FIG. 4(E)). As one example, the display color of the two predictive trajectory lines TR1', TR2' of FIG. 4(C) for example is orange for example, and the display color of the two predictive trajectory lines TRS1', TRS2' of FIG. 4(E) for example is green for example.

In FIG. 4(E) for example, each of the two solid straight lines that are respectively representative of the two predictive trajectory lines TRS1', TRS2' extends from an end or a lower end for example, of the display range AR up to the horizontal line H for example. In other words, according to stop of the display of the deviation warning line WR, each of the two solid straight lines that are respectively representative of the two predictive trajectory lines TRS1', TRS2' is extended up to the horizontal line H for example. In this manner, the driver can recognize the advancement direction and the advancement trajectory or the like of the driver's own vehicle more easily. However, the two predictive trajectory lines TRS1' TRS2' are not extended up to the horizontal line H; and therefore, these lines may end at the dotted white line WL2 (a boundary line) for example.

When detection of the rear vehicle does not complete in step ST12 of FIG. 3, the display controller 200 can update the display angle of the two predictive trajectory lines TR1, TR2 of FIG. 4(B) for example, to the display angle of the two predictive trajectory lines TR1', TR2' of FIG. 4(C) for example, according to the decrease in the steering angle (refer to step ST19 of FIG. 2). The display angle of the predictive trajectory lines is updated according to the change in the steering angle, so that the driver can more momentarily associate the two predictive trajectory lines TR1', TR2' (the degree of caution as to the lane change) of FIG. 4(C) for example, and the deviation warning line WR (the degree of caution as to the rear side vehicle) of FIG. 4(C) for example.

When the increase in the steering angle is detected in step ST07 of FIG. 2, the display controller 200 can update the display angle of the two predictive trajectory lines TR1, TR2 of FIG. 4(B) for example, according to the increase in the steering angle (refer to step ST19 of FIG. 2). However, when the display angle of the predictive trajectory lines reaches an angle limit, the display controller 200 can stop update of the display angle of the predictive trajectory lines (refer to step ST17 and step ST18 of FIG. 2). In FIG. 4(F) for example, only one predictive trajectory line TRS2" for example is displayed in the display range AR. In other words, one predictive trajectory line TR1 for example, of FIG. 4(B) for example, moves outside of the display range AR, according to the increase in the steering angle.

The display controller 200 is capable of generating the two predictive trajectory lines TR1, TR2 that are respectively straight lines for example, so that an angle formed between the virtual image and the dotted white line WL2, of the two predictive trajectory lines TR1, TR2 of FIG. 4(B) for example, increases as the amount of manipulation of the steering wheel increases. Thus, when the amount of manipulation of the steering wheel is large, there is a possibility that the two predictive trajectory lines TR1, TR2 moves outside of the display range AR. Therefore, when the amount of manipulation of the steering wheel reaches a predetermined amount, the display controller 200 is capable of generating one predictive trajectory line TRS2" (fixed secondary vehicle information) for example, as shown in FIG. 4(F) for example, which does not change according to the increase in the steering angle. In this manner, when the amount of manipulation of the steering wheel is large, the display controller 200 can keep the second vehicle information in the display range AR.

When the display angle of the predictive trajectory lines reaches an angle limit in step ST17 of FIG. 2, the display controller 200 may display, as the fixed secondary vehicle information, the graphics TRS2" that is disposed to be adjacent to the deviation warning line WR in FIG. 4(G) for example, in place of one predictive trajectory line TRS2" for example, in FIG. 4(F) for example. In FIG. 4(G), the graphics TRS2" that is a triangular shape for example (the fixed second vehicle information) is disposed not only at the right adjacency to the deviation warning line WR that is the traveling lane L2 side, but also an end or a lower end for example, of the display range AR. In this manner, the driver can continue to recognize the presence of the rear side vehicle. Incidentally, the graphics TRS2" in FIG. 4(G) for example may be any graphics without being limited to the triangular shape, and an arrow for example may be selected as to the graphics (the fixed secondary vehicle information).

Incidentally, in FIG. 2, FIG. 3, and FIG. 4(A) to FIG. 4(G), it is shown to be presupposed that the traveling lane of the driver's own vehicle (L2 of FIG. 4(A) or the road on which the driver's own vehicle is traveling is a straight line. However, the traveling lane of the driver's own vehicle may not be a straight line, or alternatively, may be a curve for example. When the road on which the driver's own vehicle is traveling is curved for example, one deviation warning line WR for example, which is a straight line for example, of FIG. 4(B) for example, may be a curve which can be curved according to the curvature or the curvature radius of the road for example. In other words, in the viewpoint 102 of the driver, it is preferable that the virtual image V of one deviation warning line WR for example, be disposed on the boundary line of the curve (the actual landscape). Similarly, in the viewpoint 102 of the driver, it is preferable that the two predictive trajectory lines TR1, TR2 for example, that are respectively straight lines, for example, of FIG. 4(B) for example, be a curve for example, which is coincident with an actual advancement trajectory that the left and right front wheels for example, of the driver's own vehicle will advance in the future.

In FIG. 4(B) for example, one deviation waring line WR (the first vehicle information for example) and the two predictive trajectory lines TR1, TR2 (the second vehicle information) each are a straight line. However, these items of vehicle information each may be a straight line of which only part is straight or may be a partially straight line, or alternatively, may be a combination of a plurality of straight portions. In the deviation warning line WR that is a straight line for example, a curved portion or graphics or the like may be added to each end or one end of the straight line. In addition, each of the two predictive trajectory lines TR1, TR2 which are respectively straight lines for example may be a plurality of straight portions which are combined with each other in the middle of the straight line. In other words, when the road on which the driver's own vehicle is traveling is a straight line, the first vehicle information and/or the second vehicle information are/is not complete straight line(s), and may have a straight forwarding property. In FIG. 4(B) for example, the shape of one deviation warning line WR for example, has a straight forwarding property; and therefore, the driver can easily associated the deviation warning line WR and the boundary line with each other (for example, the dotted white line WL2 of FIG. 4(A) for example). In addition, in FIG. 4(B) for example, the shape of the two predictive trajectory lines TR1, TR2 for example, has a straight forwarding property; and therefore, the driver can more easily recognize a direction in which the driver's own vehicle moves to the boundary line, or alternatively, a position at which the vehicle passes through the boundary line.

When the road on which the driver's own vehicle is traveling is curved, one deviation warning line WR (the first vehicle information) for example may have a curving property only, in place of a perfect curve having a curvature or a curvature radius which is completely equal to a curvature or a curvature radius of the road. In other words, one deviation warning line WR for example may be a curve of which only part is curved or which is partially curved, or alternatively, may be a combination of a plurality of curved portions. In addition, when the road on which the driver's own vehicle is traveling is curved, the two predictive trajectory lines TR1, TR2 (the second vehicle information) for example may have a curving property only, in place of a perfect curve which is completely coincident with an actual advancement trajectory that the left and right front wheels for example of the driver's own vehicle will advance in the future. In other words, each of the two predictive trajectory lines TR1, TR2 for example may be a curve of which only part is curved or may be partially curved, or alternatively, may be a combination of a plurality of curved portions.

In addition, it is preferable that the initial value of the steering angle in step ST08 of FIG. 3 be set or updated according to the curvature or the curvature radius of a curved road, in place of zero. Here, the curvature or the curvature radius of the curved road, as one example, may be detected or extracted by the image processing unit 310 for example, based on the image-capturing unit 103 or a front side camera for example, or alternatively, may be detected or acquired by the road information acquiring unit 320 for example, or a navigation device for example, based on the roadmap information for example.

FIG. 5 shows one example of a table for determining a display format of the degree of caution as to vehicle information. As shown in FIG. 5 for example, the display controller 200 of FIG. 1 can determine the display format of the degree of caution as to vehicle information (one deviation warning line WR for example, of FIG. 4(B) for example). In FIG. 5 for example, three display strengths for example are shown. Specifically, the relative speed is classified by a low speed, a middle speed, and a high speed, and the relative distance is classified by a long distance, a middle distance, and a short distance.

As one example, when the relative speed is 10 [km/h] or less for example, the relative speed is set at a low speed. Next, when the relative speed is more than 10 [km/h] for example, and is less than 30 [km/h] for example, the relative speed is set at a middle speed. Next, when the relative speed is 30 [km/h] for example, the relative speed is set at a high speed.

Specifically, when the relative speed is the relative speed of the rear side vehicle with respect to the driver's own vehicle for example, and the absolute speed of the driver's own vehicle is 40 [km/h] for example, the relative speed of the rear side vehicle having the absolute speeds of 10 [km/h], 20 [km/h], 30 [km/h], 40 [km/h], 50 [km/h], 60

[km/h], and 70 [km/h] for example, with respect to the driver's own vehicle are respectively set, for example at a low speed (−30 [km/h]=10 [km/h]−40 [km/h]), a low speed (−30 [km/h]=10 [km/h]−40 [km/h]), a low speed (−20 [km/h]=20 [km/h]−40 [km/h], a low speed (−10 [km/h]=30 [km/h]−40 [km/h]), a low speed (0 [km/h]=40 [km/h]−40 [km/h], a low speed (10 [km/h]=50 [km/h]−40 [km/h], a middle speed (20 [km/h]=60 [km/h]−40 [km/h], and a high speed (30 km/h)=70 [km/h]−40 [km/h]).

Similarly, as one example, when the relative distance is 10 [m] or less for example, the relative distance is set at a short distance. Next, when the relative distance is longer than 10 [m] for example, and is shorter than 30 [m] for example, the relative distance is set at a middle distance. Next, when the relative distance is 30 [m] or more for example, the relative distance is set at a long distance. In addition, the relative distance is the relative distance of the rear side vehicle with respect to the driver's own vehicle for example (the distance from the rear side vehicle to the driver's own vehicle).

When the relative speed of the rear side vehicle with respect to the driver's own vehicle is a high speed for example, the absolute speed of the rear side vehicle is higher than the absolute speed of the driver's own vehicle, in other words, it is possible to construe that the rear side vehicle is approaching the driver's own vehicle. Therefore, it is preferable that the degree of caution when the relative speed of the rear side vehicle with respect to the driver's own vehicle is a high speed for example be higher. Alternatively, when the relative speed of the rear vehicle with respect to the driver's own vehicle is a low speed for example, it is possible to construe that the absolute speed of the rear side vehicle is substantially equal to or lower than the absolute speed of the driver's own vehicle, and the degree of caution when the relative speed is a low speed may be lower.

Next, when the relative distance of the rear side vehicle with respect to the driver's own vehicle is a short distance for example, it is also possible to construe that there exists an apprehension of a collision with the rear side vehicle subsequent to a lane change of the driver's own vehicle, and it is preferable that the degree of caution when the relative distance is a short distance be higher. Alternatively, when the relative distance of the rear side vehicle with respect to the driver's own vehicle is a long distance for example, it is possible to construe that there is a low possibility of a collision with the rear side vehicle after a lane change of the driver's own vehicle, and the degree of caution when the relative distance is a long distance may be lower. In FIG. 5, the display strength I corresponds to a low degree of caution for example; the display strength III corresponds to a high degree of caution for example (for example, the degree of warning); and the display strength II corresponds to a middle degree of caution for example.

In FIG. 4(B) for example, one deviation warning line WR for example, corresponds to the display strength III, and the display color is red for example. Afterwards, when the absolute speed of the rear side vehicle decreases for example, and the relative speed is a middle speed, the display color of the deviation warning line WR that corresponds to the display strength II for example may make a color change from red for example to red brown (amber) for example. Subsequently, when the absolute speed of the rear side vehicle further decreases and then the relative speed is a high speed, the display color of the deviation warning line WR that corresponds to the display strength I for example may make a color change from amber for example to yellow for example. In this manner, as the degree of caution increases, the display format of one deviation warning line WR for example can be set at a display color having more red components for example.

The display format of one deviation warning line for example may include a change or a classification of intensity of display (gradation) in place of, or in addition to, the change or classification of the display color. As the degree of cation increases, the display format of one deviation warning line WR for example can be set at a higher intensity of display for example. Similarly, the display format of one deviation warning line WR for example may include a change or a classification of the display range (a thickness). As the degree of caution increases, the display format of one deviation warning line WR for example can be set in a wider display range (a thick line) for example. Similarly, the display format of one deviation warning line WR for example may include a change or a classification of a blinking speed. As the degree of caution increases, the display format of one deviation warning line WR for example can be set at a higher blinking speed for example.

The display format shown in FIG. 5 for example may be applied to the two predictive trajectory lines TR1, TR2 of FIG. 4(B) for example. In FIG. 4(B), the display color of the two predictive trajectory lines TR1, TR2 of FIG. 4(B) is yellow (orange) for example; and however, the display color may change according to the degree of caution (the relative speed and the relative distance between the driver's own vehicle and the rear side vehicle). Of course, the display color (the display format) of the two predictive trajectory lines TR1, TR2 of FIG. 4(B) for example may be set at red for example, in other words, may be set to be the same as the display color (the display format) of one deviation warning line WR of FIG. 4(B) for example.

The display format shown in FIG. 5 is merely provided as one example; and therefore, one deviation warning line WR (the first vehicle information) of FIG. 4(B) for example, and/or the two predictive trajectory lines TR1, TR2 (the second vehicle information) of FIG. 4(B) for example may be based on the relative speed only, or alternatively, may be based on the relative distance only. Incidentally, in FIG. 4(E) for example, the display format of one deviation warning line WR for example, is set at zero or to be lower than the display strength I, and the display of the deviation warning line WR is stopped. Similarly, the display color of the two predictive trajectory lines TRS1, TRS2 of FIG. 4(D) for example, is green for example, and the degree of caution (the display strength) is set at zero or to be lower than the display strength I.

In addition, the display format of the two predictive trajectory lines TR1, TR2 (the second vehicle information) of FIG. 4(B) for example may change according to another item of information. Another item of information is a change rate of steering angle information for example. Specifically, as a rate of an increase of the steering angle is higher, in other words, as the probability of the driver's own vehicle moving to the deviation warning line is higher for example, it is possible to set the degree of caution (the display strength) of the two predictive trajectory lines TR1, TR2 (the second vehicle information) for example to be higher.

The present invention is not limited to the exemplary embodiment described above, and it would be apparent to one skilled in the art to be able to readily modify the exemplary embodiment described above up to the scope of the invention that is encompassed in the claims.

INDUSTRIAL APPLICABILITY

The present invention is preferably suitable as a display device to display a virtual image so as to overlap an actual landscape within a window shield of a vehicle.

DESCRIPTION OF REFERENCE NUMERALS

20 . . . Display
21 . . . Reflector
100 . . . Display mechanism
101 . . . Window shield
102 . . . Viewpoint of a/the driver
103 . . . Image-capturing unit
200 . . . Display controller
210 . . . Determining unit
220 . . . Generating unit
230 . . . Storage unit
300 . . . LAN
310 . . . Image processing unit
320 . . . Road information acquiring unit
330 . . . Position information acquiring unit
340 . . . Instruction information acquiring unit
350 . . . Vehicle speed information acquiring unit
360 . . . Rear side vehicle information acquiring unit
370 . . . Ladder angle information acquiring unit
AR . . . Display range
L . . . Display light
L1, L2, L3 . . . Lanes
H . . . Horizontal line
P . . . Processing unit
S . . . Information acquiring unit
TR1, TR2, TR1', TR2', TR2", TRS1, TRS2, TSR1', TSR2' . . . Second lane information
V . . . Virtual image
WL1, WL2, WL3, WL4 . . . Boundary lines
WR . . . First lane information

The invention claimed is:

1. A vehicle information projecting system, comprising:
an image-capturing unit that captures an image of an actual landscape in front of a vehicle, the actual landscape including a road on which the vehicle is traveling, the road including a traveling lane in which the vehicle is traveling and an adjacent lane disposed adjacent to the traveling lane;
a rear side information acquiring unit that detects a rear side vehicle being present at a rear side of the vehicle, wherein the detecting the rear side vehicle includes acquiring rear side vehicle information of the rear side vehicle;
a steering angle sensor that detects a steering angle of a steering wheel of the vehicle;
a lane change information acquiring unit that detects the vehicle making a lane change from the traveling lane to the adjacent lane based at least on the steering angle of the steering wheel;
a display mechanism that projects a virtual image within a part of a windshield of the vehicle so that the virtual image overlaps the actual landscape; and
a processing unit that:
determines a degree of caution with respect to the rear side vehicle based on the acquired rear side vehicle information and the detected lane change;
generates, in response to detecting the rear side vehicle and detecting the lane change, a first virtual object to be included in the virtual image, the first virtual object indicates the determined degree of caution;
generates, in response to detecting the rear side vehicle and detecting the lane change, a second virtual object to be included in the virtual image, the second virtual object indicating a trajectory line to be followed by the vehicle, the trajectory line predicted based on the steering angle; and
controls the display mechanism to include the generated first virtual object and the generated second virtual object in the virtual image so that 1) the first virtual object overlaps a boundary line between the traveling lane and the adjacent lane and 2) the second virtual object is disposed at an angle with respect to the first virtual object;
wherein when the steering angle sensor detects a change in the steering angle, the angle at which the second virtual object is disposed with respect to the first virtual object is adjusted by moving the second virtual object based on the change in the steering angle,
wherein when 1) the angle at which the second virtual object is disposed with respect to the first virtual object meets a threshold and 2) the second virtual object deviates off of the virtual image, the processing unit;
generates a third virtual object; and
controls the display mechanism to 1) remove the second virtual object from the virtual image and 2) include the third virtual object in the virtual image.

2. The vehicle information projecting system according to claim 1, wherein the third virtual object is disposed adjacent to the first virtual object to replace the second virtual object in the virtual image.

3. The vehicle information projecting system according to claim 2,
wherein the rear side vehicle information is based on a relative speed and/or a relative distance between the vehicle and the rear side vehicle,
the processing unit determines a display format of the first virtual object indicating the degree of caution with respect to the rear side vehicle, based on the relative speed and/or the relative distance, and
the processing unit adjusts the display format of the first virtual object according to changes in the degree of caution.

4. The vehicle information projecting system according to claim 2,
wherein the processing unit determines a display format of a degree of caution as to the second virtual object, based on a change rate of the steering angle, and
the processing unit adjusts the second virtual object according to the change rate of the steering angle.

5. The vehicle information projecting system according claim 1,
wherein a positional relation between the first virtual object and the third virtual object is constant regardless of the change in the steering angle.

6. The vehicle information projecting system according to claim 5,
wherein the processing unit determines a display format of a degree of caution as to the second virtual object, based on a change rate of the steering angle, and
the processing unit adjusts the second virtual object according to the change rate of the steering angle.

7. The vehicle information projecting system according to claim 5,
wherein the rear side vehicle information is based on a relative speed and/or a relative distance between the vehicle and the rear side vehicle,
the processing unit determines a display format of the first virtual object indicating the degree of caution with respect to the rear side vehicle, based on the relative speed and/or the relative distance, and
the processing unit adjusts the display format of the first virtual object according to changes in the degree of caution.

8. The vehicle information projecting system according to claim 1,
wherein the rear side vehicle information is based on a relative speed and/or a relative distance between the vehicle and the rear side vehicle,
the processing unit determines a display format of the first virtual object indicating the degree of caution with respect to the rear side vehicle, based on the relative speed and/or the relative distance, and
the processing unit adjusts the display format of the first virtual object according to changes in the degree of caution.

9. The vehicle information projecting system according to claim 1,
wherein the processing unit determines a display format of a degree of caution as to the second virtual object, based on a change rate of the steering angle, and
the processing unit adjusts the second virtual object according to the change rate of the steering angle.

10. A vehicle information projecting method, including:
reading, as a captured image, a road which is present at a front side of a vehicle;
detecting a rear side vehicle which is present at a rear side of the vehicle;
detecting a steering angle of a steering wheel of the vehicle;
detecting an attempt of the vehicle making a lane change from a traveling lane of the vehicle to an adjacent lane which is adjacent to the traveling lane based on the detected steering angle of the steering wheel;
determining a degree of caution as to the rear side vehicle before the vehicle completes a lane change from the traveling lane to the adjacent lane thereto;
generating a first virtual object, based on the degree of caution and the captured image, so that the first virtual object overlaps a boundary line between the traveling lane and the adjacent lane thereto;
generating a second virtual object, based on the detected steering angle and the detected attempt, so that the second virtual object is disposed at an angle with respect to the first virtual object; and
projecting the first virtual object and the second virtual object in a display range which is set within a part of a windshield of the vehicle,
wherein when a change is detected in the steering angle, the angle at which the second virtual object is disposed with respect to the first virtual object is adjusted according to the change in the steering angle.

* * * * *